United States Patent [19]

Weiss et al.

[11] 3,853,945
[45] Dec. 10, 1974

[54] PROCESS OF PREPARING ALPHA-SUBSTITUTED ACRYLIC COMPOUNDS

[75] Inventors: Francis Weiss; Raymond Rusch, both of Pierre-Benite, France

[73] Assignee: Ugine Kuhlmann, Paris, France

[22] Filed: July 17, 1968

[21] Appl. No.: 745,379

Related U.S. Application Data

[63] Continuation-in-part of Ser. No. 328,096, Dec. 4, 1963, abandoned, Continuation-in-part of Ser. Nos. 413,350, Nov. 23, 1964, abandoned, and Ser. No. 647,341, June 20, 1967, abandoned.

[30] Foreign Application Priority Data

Dec. 8, 1962 France .......................... 62.918000
Nov. 21, 1963 France .......................... 63.954478

[52] U.S. Cl. .......... 260/465.4, 260/464, 260/465 R, 260/465 D, 260/465 K, 260/465.8 D, 260/465.9
[51] Int. Cl. .......................................... C07c 121/02
[58] Field of Search .......... 260/465.8, 465.4, 465.9, 260/, 465.8 D, 464, 465 D

[56] References Cited
UNITED STATES PATENTS
3,225,082  12/1965  McClure ..................... 260/465.8 X FOREIGN PATENTS OR APPLICATIONS
1,350,741  12/1963  France ........................... 260/465.9

OTHER PUBLICATIONS
Tanaka, et al. Journal of the Chemical Society of Japan, 62(11), 1786–1788, November 1959, pages 1 and 3 of translation (found in 260-465.8).
Holmes, Organic Reactions, Vol. IV, 1949, pages 60, 61, 64, 65, 66 and 77, relied on.
Bruson, Organic Reactions, Vol. V, 1952, pages 103–104, relied on.
Jones, et al., C. A., Vol. 49, 1955, p. 8142 copy in Sci. Lib. QD–1–A51.

*Primary Examiner*—Joseph Paul Brust
*Attorney, Agent, or Firm*—Pennie & Edmonds

[57] ABSTRACT

α-substituted acrylic compounds of the formula

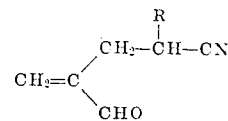

wherein R is hydrogen or a methyl group is prepared by initially reacting a dienic compound such as cyclopentadiene or anthracene with acrolein at a temperature sufficiently high to form a Diels-Alder adduct. The adduct thus formed then reacts with an acrylonitrile of the formula

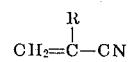

in the presence of a base such as sodium or potassium hydroxide, or an organic amine at a temperature in the range between 0° and 80°C. to form a Michael's adduct of the formula

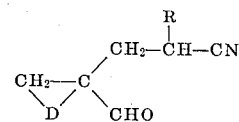

wherein R has the same meaning as stated above and D is the dienic moiety. The Michael's adduct is pyrolyzed at a temperature in the range between 90° and 600°C. to form the α-substituted acrylic compounds. The aldehyde group can be transferred into a number of new functions including —COOH, COOR′, CN and CONH$_2$ groups, wherein R′ is a lower alkyl group containing 1 to 4 carbon atoms.

8 Claims, No Drawings

PROCESS OF PREPARING ALPHA-SUBSTITUTED ACRYLIC COMPOUNDS

CROSS REFERENCE TO RELATED APPLICATIONS

This application is a continuation-in-part application of our United States patent applications Ser. No. 328,096 filed Dec. 4, 1963 now abandoned, Ser. No. 413,350 filed Nov. 23, 1964, and Ser. No. 647,341 filed June 20, 1967, both now abandoned.

FIELD OF THE INVENTION

This invention relates to α-substituted acrylic compounds and the methods for preparing the same.

SUMMARY OF THE INVENTION

α-substituted acrylic compounds of the formula

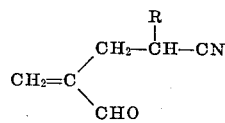

wherein R is hydrogen or a methyl group is prepared by reacting acrolein at a suitable temperature with cyclopentadiene or anthracene to form a Diels-Alder adduct which is in turn reacted with an acrylonitrile of the formula

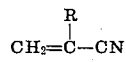

in the presence of a base and at a temperature in the range between 0° and 80°C. to form a Michael's adduct of the formula

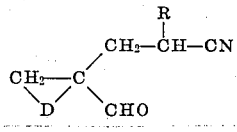

wherein R has the same meaning as stated above and D is the dienic moiety of cyclopentadiene or anthracene. The Michael's adduct is pyrolyzed at a temperature sufficiently high to remove the dienic moiety thereby forming the α-substituted acrylic compound. The resultant compound can be further transformed to 4-cyano-2-methylene butyric acid of the formula

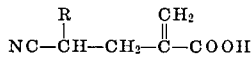

The —COOH function can be further transformed to the —COOR' and CONH$_2$ functions.

DESCRIPTION OF THE PREFERRED EMBODIMENTS

The preferred process of this invention comprises reacting in a first stage a dienic compound D with acrolein at a suitable temperature, depending on the dienic compound used, to obtain a Diels-Alder adduct of the formula

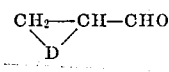

In a second stage the adduct is reacted under the general conditions of a Michael reaction with an acrylonitrile or methacrylonitrile of the formula

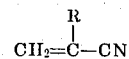

wherein R is H or a CH$_3$ group to obtain a compound of the following formula

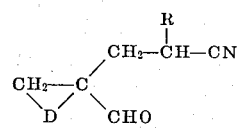

Finally, the Michael's adduct is thermally decomposed according to the following reaction

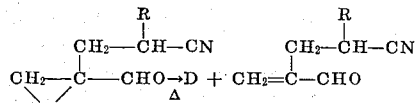

In the first stage of the process, the dienic addition may be carried out according to the well known Diels-Adler reaction and the operation conditions may be selected within a wide range depending on the reactivity of the dienic compound used. When cyclopentadiene is used for preparing the Diels-Alder adduct, the reaction may take place at a temperature in the range between 0° and 100° C. If the reaction is conducted at normal room temperature, a complete dienic addition may be completed within a few hours. When anthracene is used, the preferred temperature range is between 100° and 200° C. and the reaction is advantageously carried out in an autoclave. The dienic addition is preferably carried out in an inert solvent such as aliphatic, cycloaliphatic or aromatic hydrocarbons containing 5 to 10 carbon atoms. It is generally desirable to add to the reaction medium, in a usual manner, a small amount of stabilizer for the acrolein and a polymerization inhibitor such as copper salts and hydroquinone.

In the second stage, the conditions for preparing the Michael's adduct using acrylonitrile or methacrylonitrile have been described in French Pat. No. 1,337,898 entitled, "New Acid Aldehydes and Their Derivatives" and issued to the Assignee of this application.

Preferably in the second stage, the reaction is carried out in the presence of a base such as NaOH, KOH, sodium ethylate, or a hydroxide of quaternary ammonium such as benzyl-trimethylammonium hydroxide, in an alcoholic medium such as t-butanol, ethanol, methanol, in an ether medium such as diethylether, tetrahydrofuran and dioxane, or in benzene, in toluene or in acetonitrile. The reaction temperature advantageously is in the range between 0° to 60° C. Within this temperature range, the reaction usually completes in 0.5 to 6.0 hours.

The thermal decomposition of the third stage is achieved by heating the compounds obtained in the second stage at a temperature between 200° and 600°

C. The particular temperature depends essentially on the nature of the dienic compound used and on the thermal stability of the generated compounds. The compounds prepared with anthracene decompose themselves at a relatively low temperature, i.e., 200°–350° C., equal to or lower than the boiling temperature under preferred pressure conditions, i.e., atmospheric or reduced pressure. It is generally desirable to heat these compounds initially by themselves which are in a liquid state, and eventually to heat them in the presence of a solvent or of a diluent of high boiling point and being stable at the required heating temperature conditions. Examples of suitable solvents or diluents are hydrocarbons such as diphenyl, terphenyl, dodecylbenzene, paraffinic oils or compounds such as the phenyl oxide, etc.

The alpha substituted acrylic aldehyde distills progressively during its formation. It may be subsequently further purified in a well-known manner, for instance by fractional distillation. The dienic anthracene and cyclopentadiene does not usually distill off under the normal recovery conditions. The dienic compounds may be recovered from the residue which may be alone or mixed with the diluent by crystallization and filtration. The diene recovery is practically quantitative.

Alternatively, the product of the second stage may be progressively introduced into a desired amount of an inert medium maintained at the reaction temperature. In this manner a reaction may take place and the product is recovered from the bottom of the vessel.

A similar pyrolysis procedure can be followed when the starting dienic compound is cyclopentadiene whose Michael's adducts decompose themselves at temperatures as low as 200°–250°C. or lower, e.g., 90°–120°C. Contrary to the anthracene adduct, the cyclopentadienic compounds regenerate a volatile diene which distills with the ethylenic aldehyde obtained, so that the decomposition leaves no residue. Using cyclopentadiene adduct, it is possible to operate continuously by simply heating the reaction medium at the reflux temperature and continuously introducing the adduct to be decomposed at a speed depending upon the distillation speed of the decomposition products. It is also possible, as in the case of the anthracene adduct, to pour the adduct into a volume of diluent having the desired temperature.

The resultant product

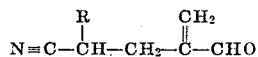

can be oxidized into its corresponding 4-cyano-2-methylene butyric acid. A number of oxidizing agents can be used in the oxidation step of the present invention. For example, an organic peracid such as performic, peracetic, perbenzoic, monoperphthalic or monopermaleic acids can be used advantageously as an oxidant in an inert solvent such as water, t-butanol, etc. Equally suitable as an oxidant is hydrogen peroxide in the presence of a mineral catalyst which may be selected from the group including mineral acid, such as tungstic acid, molybdic acid, selenium dioxide, and heteropolyacids such as phospho-tungstic acid, seleno-tungstic acid, and sulfuric acid.

Conveniently, air or oxygen may also be used. In this instance, the oxidation is preferably carried out in a basic or an acid solution in the presence of a catalyst.

Suitable catalysts for use in a basic solution include silver oxide and reduced silver. In the acid solution, the catalyst can be manganese, cobalt, or copper salts. The temperature for the oxidation step in solution is low, preferably between 0° and 80° C.

We have also found that the oxidation step may be carried out in the gaseous phase at high temperature. The oxidation comprises passing a gaseous mixture containing about 1 to 10 percent of the aldehyde to be oxidized and 90 to 99 percent of air (which may be diluted with water vapor) over a catalyst at a temperature in the range between 300° to 400°C. The catalyst is selected from the group consisting of molybdenum oxides, and oxides of tungsten, cobalt, and bismuth.

The oxidation step for converting the aldehyde function to the acid function may be conducted prior to the pyrolysis for the removal of the dienic component. In this alternative method, the nitrile substituted dienic aldehyde prepared in accordance with the first two steps of the method previously described is first oxidized to its corresponding acid prior to pyrolysis to remove its dienic radical. The reaction can be represented by the following equations:

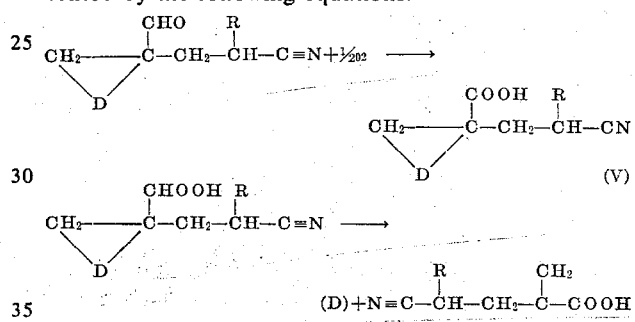

(V)

The lower alkyl esters of 4 cyano-2 methylene butyric acids can be prepared by esterifying the acids by known methods. Alternatively, it can be produced by esterifying the nitrile substituted dienic acid

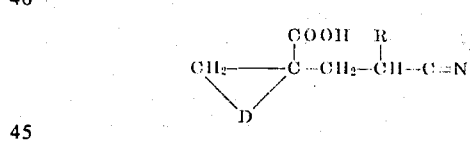

prior to the pyrolysis step. The resultant ester can be further treated in well known manner to convert the COOR' group to CN and CONH$_2$ functions.

The products prepared by the method of this invention

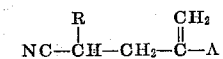

wherein A is CHO, COOH, COOR', CN, or CONH$_2$ are monomers of great practical importance. They possess the structure of an acrylic aldehyde, acid, ester, etc., and are substituted at the alpha position by a cyano ethyl group. These compounds may be used as an intermediate or used as monomers to produce by radical polymerization, homopolymers or copolymers with other acrylic or vinylic monomers containing nitrile functions, possessing desirable properties, and in particular, a good resistance to oils.

Esters and dinitrile of the following formulas

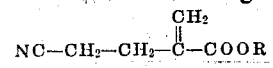

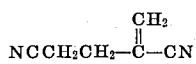

are presently commercially marketed as monomers for preparing polymers.

The following examples illustrate the invention:

EXAMPLE 1

This example relates to preparation of alpha (cyanoethyl) acrolein (or formyl-4 pentene-4 nitrile)

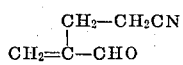

First Stage

Dihydro-9-10 (formyl-11 ethano) 9-10 anthracene, which is the product of dienic addition obtained from acrolein and anthracene according to the British Pat. No. 749,723 of Nov. 9, 1953, is prepared.

Second Stage

In 20 minutes' time a suspension of 195 g of said dihydro-9-10 (formyl-11 ethano)-9-10 anthracene (0.83 mole) in 200 cc of dioxan is then introduced into a flask fitted with a stirring device and containing:

500 cc of dioxan
87 g of acrylonitrile (1.64 mole)
10 cc of a 10 percent potassium hydroxide solution while maintaining the temperature between 20° and 25°C. The reactive mass is then heated during 5 hours at 35°C. while stirring and it becomes brown and homogeneous. After heating, the greater part of the dioxan is distilled off and the residue is cooled. An abundant white crystallized precipitate is obtained which is filtered. From the mother waters, diluted with water, comes still a small fraction of yellow impure crystals which are purified by mere washing with cold ethanol.

The whole crystals are dried under vacuum and we obtained 193 g (0.67 mole) of dihydro-9-10 (formyl-11 beta-cyanoethyl-11 ethano)-9-10 anthracene

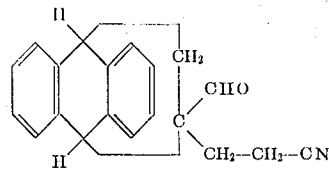

whose melting point is 130°C.

The nitrogen percentage determined by calculation for $C_{20}H_{17}NO$ is 4.88 and the percentage found in the crystal was 4.70. The yield reached 81%.

Third Stage

In a distillation balloon flask, we heated at 220°-225°C. under a pressure of 140 mm of mercury 70 g of the product prepared in the second stage (0.244 mole)
100 cc of vaseline oil The reaction lasted about 3 hours, during the course of which a colorless liquid was regularly distilled. At the end, the pressure was lowered to about 90 mm of mercury. The distillate obtained was fractionated after having been separated by decantation from a small quantity of oil carried over from the distillation.

18 g (0.165 mole) of alpha (cyanoethyl) acrolein, a colorless liquid with a sharp odor, was obtained with an output of 67.5 percent. Its characteristics were as follows:

| | |
|---|---|
| Boiling point | 135°C. under 50 mm mercury |
| $n_D^{25}$ | 1.4600 – 1.4605 |
| $d_4^{25}$ | 1.0005 |
| Molecular refraction | 29.81 (calculated 29.27) |
| % N | 12.7 (% calculated for $C_6H_7NO$ : 12.83) |

Determination of the aldehyde function by hydroxylamine chlorhydrate as well as determination of the double bonds by bromination, showed that the product obtained had a purity of 97.5 to 98.5 percent.

The infra-red spectrum of a solution at 10 percent in the $CCl_4$ represented the characteristic following rays: 955 cm$^{-1}$(C=C), 1,435 cm$^{-1}$ (CH$_2$=C<), 1,700 – 1,710 cm$^{-1}$ (>CO) 2,260 cm$^{-1}$ (–CN), 2,710 cm$^{-1}$ (aldehyde)

The ultra-violet spectrum presented at 218 m$\mu$($\epsilon$6,500) and 325 m$\mu$($\epsilon$26) the characteristics of absorption rays of an alpha-beta ethylenic aldehyde.

By reaction with the dinitro-2-4 phenylhydrazine, one obtained red crystals of dinitro-2-4 phenylhydrazone which, after recrystallization in ethanol, had a melting point of 173°C. The nitrogen content was 23.6 percent (content calculated for $C_{12}H_{11}N_5O_4$ was 24.2 percent).

EXAMPLE 2

Preparation of alpha (cyanoethyl) acrolein

In a first stage, we prepared by a Diels-Alder reaction between cyclopentadiene and acrolein, a bicyclo (2,2,1) formyl-2 heptene-5. Then, in a second stage, we prepared by a reaction of the product of the first stage with acrylonitrile, a bicyclo (2,2,1) formyl-2 (beta-cyano) ethyl-2, heptene-5 according to the French Pat. No. 1,337,898 of the Assignee of this application, filed on Aug. 10, 1962, and relating to "New Acid Aldehydes and Their Derivatives."

In a third stage, 55 g (0.314 mole) of the product of the second stage was progressively poured, in 2 hours, into a distillation balloon flask heated to 250°C. The greater part of the addition was carried out under atomspheric pressure, and then at the end the pressure was lowered to 50 mm mercury. We collected a distillate which was fractionated to obtain, on one hand, regenerated cyclopentadiene, and, on the other hand, 24 g (0.22 mole) of alpha (cyanoethyl) acrolein. The output amounted to 70 percent.

EXAMPLE 3

Preparation of formyl-4 hexene-4 nitrile

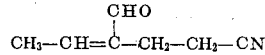

In a first stage, the dienic product of addition of crotonaldehyde and of anthracene was prepared, by heating during 4 hours at 200°C. in autoclave:

330 g of anthracene (1.85 mole)
112 g of crotonaldehyde (1.60 mole)
300 cc of toluene
0.5 g of hydroquinone After cooling, the anthracene which had not reacted was separated by filtration, then the solution was concentrated by distilling the toluene, together with some crotonaldehyde which had not transformed. After washing with ethanol, 145 g of the addition product was obtained, the melting point of which was 90°–93°C. and the purity of which was 98.8 percent (determined by oxidation of the aldehyde function). The transformation rate, referred to the crotonaldehyde engaged, amounted to 37 percent.

In a second stage, dihydro-9-10(methyl-11 formyl-12 beta-cyanoethyl-12 ethano)-9-10 anthracene was prepared by cyanoethylation of the compound obtained in the first stage. The second stage was performed under the same conditions as those of Example 1 and an output of 45 percent of a crystallized product melting at 103°–105°C. was obtained.

In a third stage, 49 g (0.16 mole) of the product prepared in the second stage was treated under the same conditions as those described in Example 1. 20 cc of a colorless distillate was obtained from which 14 g (0.11 mole) of formyl-4 hexene-4 nitrile was extracted by fractionated distillation. The output reached 69 percent. The product had the following characteristics:

| | |
|---|---|
| $Eb_{20}$ | 131°C. – 133°C. |
| $n_D^{19}$ | 1.4803 |
| $d_4^{19}$ | 0.9992 |
| Molecular refraction | 34.95 (calculated: 33.82) |
| % N determined | 11.9 (calculated for $C_7H_9NO$: 11.4) |
| Ultra-violet spectrum | maxima of absorption at 226 m and 235 m |
| Dinitrophenylhydrazone | orange crystals of melting point 215°C. – 217°C. after recrystallization in ethanol and of nitrogen percentage 23.8% (number of calculated for $C_{13}H_{13}N_5O_4$ : 23.1%) |

EXAMPLE 4

4 cyano-2 methylene butyric acid which has the formula of

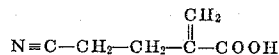

was prepared by adding into a 500 cc reactor vessel equipped with a stirrer and cooling means the following compounds:
  40 grams (0.367 moles): 4 formyl-4 pentene nitrile (obtained by the process described in example one)
  2 grams: selenium dioxide
  100 cc: tertiary butanol
Into this solution, there was introduced progressively over one hour a mixture consisting of
  18 grams: 83.5 percent aqueous hydrogen peroxide
  100 cc: tertiary butanol
The temperature was maintained in the vicinity of 40°C. by refrigeration and the reaction was allowed to proceed for 2 hours after the addition of the $H_2O_2$-butanol mixture. The reacted mixture was left overnight to stand, and the solvent was subsequently driven off by evaporation at reduced pressure and the residue was treated with 20 cc of a 10 percent aqueous solution of sodium bisulphite, and the reaction product was removed with 3 portions each of 50 cc of ether. The ethereated solution was vaporized and the residue was distilled to obtain a fraction boiling at 127°C. at 1 to 3 millimeters of mercury, which crystallized on cooling. After recrystallization in petroleum ether, 37.8 grams (0.303 moles or 82.5 percent of the theoretical yield) of pure 4 cyano-2 methylene butyric acid were recovered which have the following characteristics:
  Colorless crystals
  F = 35°–36° C.
  Purity (determined by acidimetry) = 99.5 percent
  Nitrogen = 10.9 percent for a theoretical value of (calculated for ($C_6H_7NO_2$) = 11.2%

EXAMPLE 5

4-cyano-2 methylene methyl butyrate having the formula of

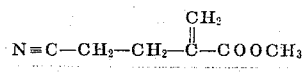

was prepared in the following manner.

A solution containing 15 grams (0.12 moles) of 4 cyano-2 methylene butyric acid and 0.2 grams of concentrated sulphuric acid and 120 grams of methanol was reflux heated for an hour and then concentrated by distillation of the excess methanol after neutralization of the sulphuric acid with baryte. The residue was distilled at reduced pressure to obtain 10.9 grams of 4 cyano-2 methylene methyl butyrate having the following characteristics:

| | | |
|---|---|---|
| $E_1$ | : | 92°–97°C. |
| $n_D^{20}$ | : | 1.4579 |
| $d_4^{20}$ | : | 1.052 |

4.5 grams of acid not transformed remained in the reactor and a small quantity of a saturated ester, probably the 4 cyano 2-methoxymethyl methyl butyrate. By reference to the transformed acid, the yield in 4 cyano-2 methylene methyl butyrate amounted to 93.5 percent.

EXAMPLE 6

4 cyano-2 methylene methyl butyrate was prepared by pyrolysis of 2-carbomethoxy 2-(β-cyano ethyl) 5-norbornene according to the following reaction:

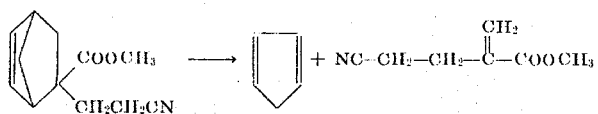

30 grams of 2-carbomethoxy 2-(β-cyano ethyl) 5-norbornene were run into a distillation vessel held at a temperature between 250° and 270°C. and at atmospheric pressure. By rectification of the distillate, 12 grams of 4 cyano-2 methylene methyl butyrate were obtained of which the characteristics were identical with those of the product obtained in Example 5. The yield amounted to 59 percent of the theoretical amount.

EXAMPLE 7

4 cyano-2 methylene n-butyl butyrate was prepared by heating a mixture consisting of 15 grams (0.12 moles) of 4 cyano-2 methylene butyric acid, 25 grams of n-butanol and 0.2 grams of sulphuric acid to boiling for 6 hours, with distillation of the butanol-water azeotrope progressively with water formed in the reaction. The excess butanol after distillation of the azeotropic mixture was then distilled at reduced pressure. The residue, neutralized and subsequently distilled at a pressure of 0.5 to 1 mm Hg. produced 16 grams of a color less liquid boiling at 95° to 98°C. at this pressure and containing by weight 92 percent of 4 cyano-2 methylene N-butyrate. The transformation yield of the acid into the ester amounted to 68 percent of the theoretical amount.

We claim:

1. A process for preparing an α-substituted acrylic compound of the formula

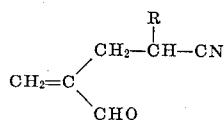

wherein R is H or CH$_3$ which process comprises:
    reacting acrolein with cyclopentadiene or anthracene at a temperature sufficient to form a Diels Alder adduct;
    treating the adduct thus formed with an acrylonitrile of the formula

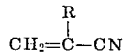

in the presence of a base and at a temperature in the range between 0° and 80°C. to form a Michael's adduct of the formula

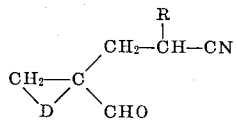

wherein R has the same meaning as stated above and D is the dienic moiety of cyclopentadiene or anthracene;
    pyrolyzing, thereafter, the Michael adduct at a temperature sufficiently high to remove the dienic moiety; and
    recovering therefrom said α-substituted acrylic compound.

2. A process according to claim 1 wherein acrolein reacts with cyclopentadiene at a temperature in the range between 0° and 100°C.

3. A process according to claim 1 wherein acrolein reacts with anthracene at a temperature in the range between 100° and 200°C.

4. A method for preparing 4-cyano-2-methylene butyric acid of the formula

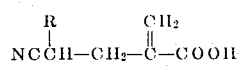

wherein R is hydrogen or a methyl group which method comprises:
    reacting in a Diels-Alder reaction acrolein with cyclopentadiene or anthracene at a temperature sufficiently high to produce an aldehyde of the formula

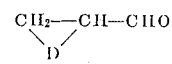

wherein D is the dienic moiety of cyclopentadiene or anthracene;
    treating the Diels-Alder adduct thus formed with an α,β-ethylenic nitrile of the formula

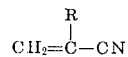

wherein R corresponds to the R defined hereinabove in the presence of a base and at a temperature in the range between 0° and 80°C. to form a Michael adduct of the formula

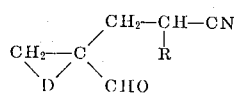

wherein D and R each correspond to the definitions stated hereinabove; and
    subjecting the Michael adduct to a sequential reaction of pyrolysis and selective oxidation to remove the dienic group therefrom and to oxidize the aldehyde group to an acid function respectively thereby producing the 4-cyano-2-methylene butyric acid, said pyrolysis being carried out at a temperature in the range between 90° and 600°C. and said oxidation reaction being carried out in an inert solvent using (I) an organic peracid, (II) hydrogen peroxide in the presence of a mineral acid or a heteropolyacid, (III) oxygen in a base solution and in the presence of silver oxide or reduced silver, or (IV) oxygen in an acid solution and in the presence of a catalytic amount of a manganese, a cobalt or a copper salt.

5. A method according to claim 4 wherein the pyrolysis precedes the oxidation.

6. A method according to claim 4 wherein the oxidation precedes the pyrolysis.

7. A method according to claim 4 wherein the oxidation is carried out at a temperature in the range between 0° and 80°C.

8. A method according to claim 4 wherein the oxidation is carried out in a gaseous phase using air as an agent in the presence of a catalytic amount of a molybdenum oxide, a tungsten oxide, a cobalt oxide, or a bismuth oxide at a temperature between 300° and 400°C.

* * * * *

UNITED STATES PATENT OFFICE
CERTIFICATE OF CORRECTION

Patent No. 3,853,945      Dated December 10, 1974

Inventor(s) Francis Weiss and Raymond Rusch

It is certified that error appears in the above-identified patent and that said Letters Patent are hereby corrected as shown below:

In the ABSTRACT, line 26, "transferred" should read

--transformed--

Signed and Sealed this ninth Day of September 1975

[SEAL]

Attest:

RUTH C. MASON
*Attesting Officer*

C. MARSHALL DANN
*Commissioner of Patents and Trademarks*